July 23, 1935.     R. S. SANFORD     2,009,095
BRAKE
Original Filed Feb. 23, 1929

INVENTOR
ROY S. SANFORD
BY
ATTORNEY

Patented July 23, 1935

2,009,095

UNITED STATES PATENT OFFICE 2,009,095

BRAKE

Roy S. Sanford, New York, N. Y., assignor to Bendix Brake Company, South Bend, Ind., a corporation of Illinois Application February 23, 1929, Serial No. 342,159
Renewed August 29, 1933

5 Claims. (Cl. 188—78)

This invention relates to brakes, and is illustrated as embodied in an internal expanding brake for an automobile. An object of the invention is to provide a powerful but simple brake utilizing the "servo" action of the drum on one shoe to intensify the force on the other shoe. Preferably there is a fixed post or the like serving as an anchor, and which takes the torque of both shoes from one shoe when the drum is turning in one direction and from the other shoe when the drum is turning in the other direction. The shoes may disconnectedly engage the anchor post, and preferably the anchor-engaging part of at least one shoe is made adjustable to compensate for wear. In order to provide the "servo" action of the one shoe on the other, the shoes are connected by brake-applying means such as a toggle.

The above and other objects and features of the invention, including a preferred shoe construction, and other novel and desirable details, will be apparent from the following description of the illustrative embodiment shown in the accompanying drawing, in which.

Figure 1:
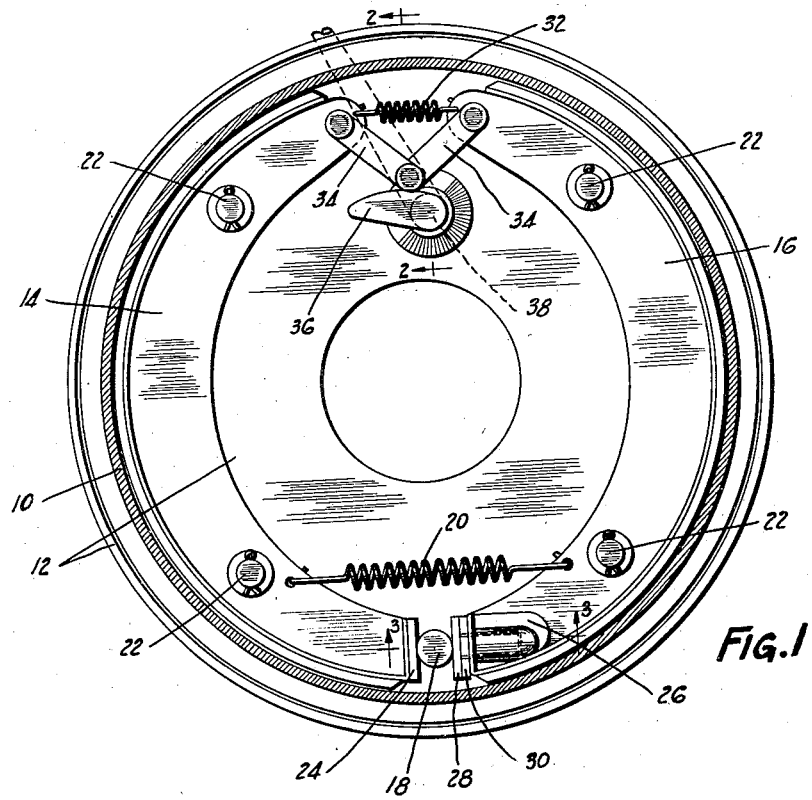
Figure 1 is a vertical section through the brake, just inside the head of the brake drum, and showing the brake shoes in side elevation.
Figures 2, 3:
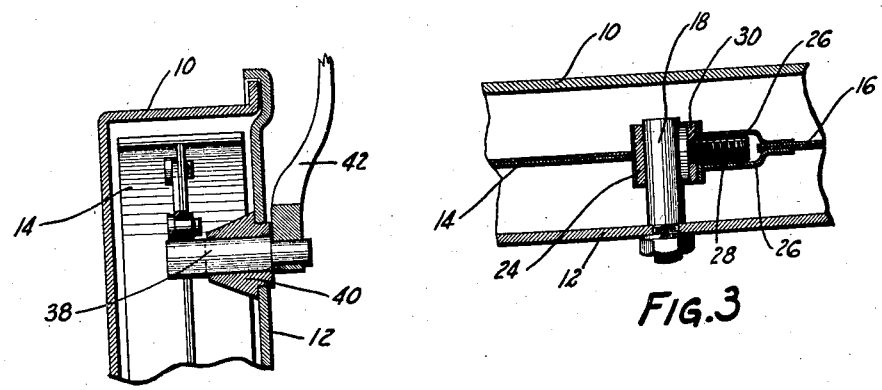
Figure 2 is a partial section on the line 2—2 of Figure 1, showing the brake-applying means.
Figure 3 is a partial section on the line 3—3 of Figure 1, showing the brake adjustment.

The illustrated brake includes a rotatable drum 10, at the open side of which is a support such as a backing plate 12, and within which is the friction means of the brake, shown as two shoes 14 and 16.

Between the lower ends of the shoes is a fixed anchor post 18 carried by the backing plate, and taking the torque of both shoes from shoe 16 when the drum is turning clockwise and from shoe 14 when the drum is turning counter-clockwise. The lower ends of the shoes in released position are yieldingly held against the post 18 by means such as a spring 20 tensioned between the shoes. The shoes have positioning devices 22 of any desired or usual character for positioning the shoes when the brake is released.

Shoe 14 has a hardened thrust plate 24 engaging the anchor post. Shoe 16 is provided at its end with a socket formed between stampings 26 welded to the sides of the shoe, and has a thrust member 28 with a head engaging post 18 and a stem extending into the socket and which has a nut 30 threaded on the stem and engaging the end of the shoe. Nut 30 can be adjusted to compensate for the wear of the brake.

The brake is applied, against the resistance of a return spring 32, by floating means such as a toggle 34 connecting the upper ends of the shoes, and the knuckle of which is engaged by a cam 36 on a shaft 38 journaled in a bracket 40 carried by the backing plate, and operated by a lever arm or the like 42.

It will be seen that when the drum is turning clockwise the shoe 14 acts with a servo action through the toggle 34 to intensify the force acting on shoe 16, this action being reversed when the drum turns in the opposite direction.

While one illustrative embodiment has been described in detail, it is not my intention to limit the scope of the invention to that particular embodiment, or otherwise than by the terms of the appended claims.

I claim:

1. A brake comprising, in combination, pair of shoes connected by a brake-applying toggle, and means for taking the braking torque from one shoe directly and from the other shoe through said one shoe and the toggle, and including a wear adjustment adapted to be taken up to preserve the most advantageous toggle angle as the brake wears.

2. A brake comprising, in combination, pair of shoes connected by a brake-applying toggle, and means for taking the braking torque from one shoe directly and from the other shoe through said one shoe and the toggle, the part of said one shoe engaging the torque-taking means being adjustable to compensate for wear of the brake.

3. A brake comprising, in combination, a drum, a pair of shoes connected by a brake-applying toggle and having a wear adjustment associated therewith, and means for taking the braking torque from one shoe directly and from the other shoe through said one shoe and the toggle when the drum is turning in one direction and for taking the torque of both shoes from said other shoe when the drum is turning in the other direction.

4. A brake comprising, in combination, pair of shoes connected by a brake-applying toggle, and means for taking the braking torque from one shoe directly and from the other shoe through said one shoe and the toggle, the part of one of said shoes engaging the torque-taking means being adjustable to compensate for wear of the brake.

5. In a brake structure, a drum, a pair of brake shoes positioned in said drum each extending throughout substantially one-half of the circumference of the drum, each having one of its ends formed with a flat surface, and having the flat ends positioned adjacent to each other, an anchor secured to the drum and positioned between the two flat ends, and means positioned between the other ends of the shoes for spreading the shoes and applying them to the drum and which means in either direction of drum rotation transmits to the anchored shoe the torque of the unanchored shoe.

ROY S. SANFORD.